US012124219B2

(12) United States Patent
Frund et al.

(10) Patent No.: US 12,124,219 B2
(45) Date of Patent: Oct. 22, 2024

(54) DEVICE FOR CONTROLLING A HOROLOGICAL MOVEMENT WITH TACTILE FEEDBACK AND TIMEPIECE, IN PARTICULAR A WATCH, COMPRISING SUCH A DEVICE

(71) Applicant: MECO SA, Grenchen (CH)

(72) Inventors: Stéphane Frund, Grenchen (CH); Rémy Thiry, Les Bréseux (FR); Samuel Geiser, Bienne (CH)

(73) Assignee: MECO SA, Grenchen (CH)

( * ) Notice: Subject to any disclaimer, the term of this patent is extended or adjusted under 35 U.S.C. 154(b) by 254 days.

(21) Appl. No.: 17/747,133

(22) Filed: May 18, 2022

(65) Prior Publication Data

US 2022/0373972 A1 Nov. 24, 2022

(30) Foreign Application Priority Data

May 19, 2021 (EP) .................................... 21174779

(51) Int. Cl.
*G04B 3/04* (2006.01)

(52) U.S. Cl.
CPC .................................... *G04B 3/048* (2013.01)

(58) Field of Classification Search
CPC .......... G04B 3/048; G04B 3/046; G04B 3/04; G04B 3/041; G04B 27/00; G04B 27/008; G04B 27/06; G04B 37/106; G04B 3/043
See application file for complete search history.

(56) References Cited

U.S. PATENT DOCUMENTS

| | | | | |
|---|---|---|---|---|
| 11,194,292 | B2 * | 12/2021 | Thiry | G04B 3/043 |
| 11,199,815 | B2 * | 12/2021 | Tschumi | G04B 3/041 |
| 11,703,802 | B2 * | 7/2023 | Avril | G04B 3/045 368/190 |

FOREIGN PATENT DOCUMENTS

| | | | |
|---|---|---|---|
| CH | 336 323 | A | 2/1959 |
| CH | 706 888 | A2 | 3/2014 |
| CH | 707 634 | A2 | 8/2014 |
| CH | 716 210 | A2 | 11/2020 |
| EP | 1 162 521 | A1 | 12/2001 |
| EP | 2 607 972 | A1 | 6/2013 |
| EP | 2 975 468 | A2 | 1/2016 |
| JP | 2014-89109 | A | 5/2014 |

OTHER PUBLICATIONS

European Search Report for 21 17 4779 dated Oct. 6, 2021.

* cited by examiner

*Primary Examiner* — Edwin A. Leon
(74) *Attorney, Agent, or Firm* — Sughrue Mion, PLLC

(57) ABSTRACT

A control device of a horological movement including a first part comprising a sliding guide tube and an activation module, and a second part slidably guided by the sliding guide tube in an axial direction relative to said first part, between an active position and an inactive position, wherein said second part comprises a slider fixed to the adjustment rod and cooperating with the activation module, and wherein the activation module includes a sheath fixed to the guide tube, cooperating with the slider and a sleeve kinematically connected with the sheath in a helical connection and being configured, under the action of an elastic member to apply mechanical stresses to the slider when the second part moves between the active position and inactive position.

10 Claims, 2 Drawing Sheets

DEVICE FOR CONTROLLING A HOROLOGICAL MOVEMENT WITH TACTILE FEEDBACK AND TIMEPIECE, IN PARTICULAR A WATCH, COMPRISING SUCH A DEVICE

CROSS-REFERENCE TO RELATED APPLICATIONS

This application claims priority to European Patent Application No. 21174779.5 filed May 19, 2021, the entire contents of which are incorporated herein by reference.

TECHNICAL FIELD OF THE INVENTION

The invention relates to the field of watchmaking, and in particular devices for controlling horological movements of timepieces, such as watches.

The invention relates in particular to a device for controlling a horological movement with tactile feedback and a timepiece, in particular a watch, comprising such a control device.

TECHNOLOGICAL BACKGROUND

In the field of watchmaking, control devices, such as push buttons or push crowns, allow the control and/or adjustment of mechanical or electronic horological movements disposed inside a case of a timepiece, for example a watch.

More particularly, the control devices can be intended, for example, for winding, time setting or adjusting any function of a horological movement.

The control devices of the prior art are at least movable in translation relative to the housing between an active, adjustment and/or control position, and an inactive, rest position. To this end, the control devices generally comprise a head extending radially outside the housing so that it can be handled by a user.

Typically, the head is connected to the adjustment rod, which is adapted to act, directly or indirectly, on the horological movement during displacement of said head.

There is a need for the user to feel when changing the position of the controller by handling the head. This need is all the more noticeable when the timepiece includes an electronic horological movement.

Indeed, generally, the devices for controlling mechanical horological movements actuate mobiles of said device when they reach their active and/or inactive positions, so that the user feels a tactile feedback in the form of a slight resistance.

However, this resistance may not be sufficient to cause remarkable tactile feedback for the user, that is to say he may not feel it.

SUMMARY OF THE INVENTION

The invention meets this need by providing a solution for a device for controlling a horological movement providing a tactile feedback to a user when the latter changes the position of said control device, said tactile feedback being of sufficient intensity to be felt by a user.

More specifically, the invention relates to a device for controlling a horological movement characterised in that it includes, on the one hand, a first part comprising a sliding guide tube intended to be fixed relative to said horological movement and an activation module, and on the other hand, a second movable part slidably guided by the guide tube in a direction called “axial direction”, relative to said first part, between an active position wherein it is able to be integral, by means of an adjustment rod, with a component of the horological movement, and an inactive position wherein said adjustment rod is intended to release the component of the horological movement, said second part comprising a slider fixed to the adjustment rod and cooperating with the activation module so that they exert mechanical stresses on each other when the second part moves between the active and inactive positions, and so that these mechanical stresses are released when the second part reaches one of the active or inactive positions.

This change of stressed and unstressed state when displacing the second part causes a sensation of tactile feedback to the user and more specifically, a sensation of indexing.

In particular embodiments, the invention may further include one or more of the following features, taken alone or in any technically possible combination.

In particular embodiments, the activation module exerts mechanical stresses on the slider in response to the displacement of said slider when the second part moves between the active and inactive positions and releases the mechanical stresses when the second part reaches the inactive position.

In particular embodiments of the invention, the activation module includes a sheath fixed to the guide tube cooperating with the slider so as to guide it in translation without degree of freedom in rotation, the activation module further comprising a sleeve kinematically connected with the sheath in a helical connection and being configured, under the action of an elastic member, to apply mechanical stresses to the slider when the second part moves between the active and inactive positions.

In particular embodiments of the invention, the sleeve and the sheath respectively include at least one slot extending axially, intended to receive a radial rod of the slider when the second part moves between the active and inactive positions.

In particular embodiments of the invention, the slot of the sleeve opens through an opening onto one end of said sleeve and includes, at this opening, a guide profile formed by an increase in section of the slot, the guide profile being configured so that when the second part displaces from the inactive position to the active position, the radial rod exerts forces against the guide profile causing the sleeve to displace against the forces exerted by the elastic member.

In particular embodiments of the invention, the sheath includes a radial flange at one of its ends in the continuation of the slot, said radial flange being perforated so as to receive the radial rod when the second part is in an inactive position.

The flange can advantageously constitute a stop against which the sleeve rests when the second part is in the inactive position.

In particular embodiments of the invention, the sheath and the guide tube define an annular volume wherein the sleeve is arranged.

In particular embodiments of the invention, the sleeve preferably includes at least one follower extending radially towards the sheath, said sheath including at least one helical aperture arranged so as to receive said follower and constituting a sliding path of said follower.

In particular embodiments of the invention, the guide tube has a shape of a stepped cylinder, comprising a first cylindrical portion, a peripheral wall of which is guided in translation by a peripheral wall of a blind cavity of the head and comprising a second cylindrical portion, a peripheral wall of which guides the adjustment rod in translation, the activation module being housed in the internal volume of the first cylindrical portion.

In particular embodiments of the invention, the guide tube includes a bottom wall forming a shoulder between its two cylindrical portions, said bottom wall bearingly receiving the elastic member.

According to another aspect, the present invention relates to a timepiece comprising a control device as described above, a case wherein a horological movement is housed, and through which said control device is inserted, the adjustment rod being connected to said horological movement.

BRIEF DESCRIPTION OF THE FIGURES

Other features and advantages of the invention will become apparent upon reading the following detailed description given by way of non-limiting example, with reference to the appended drawings wherein.

DETAILED DESCRIPTION OF THE INVENTION

Figure 1:
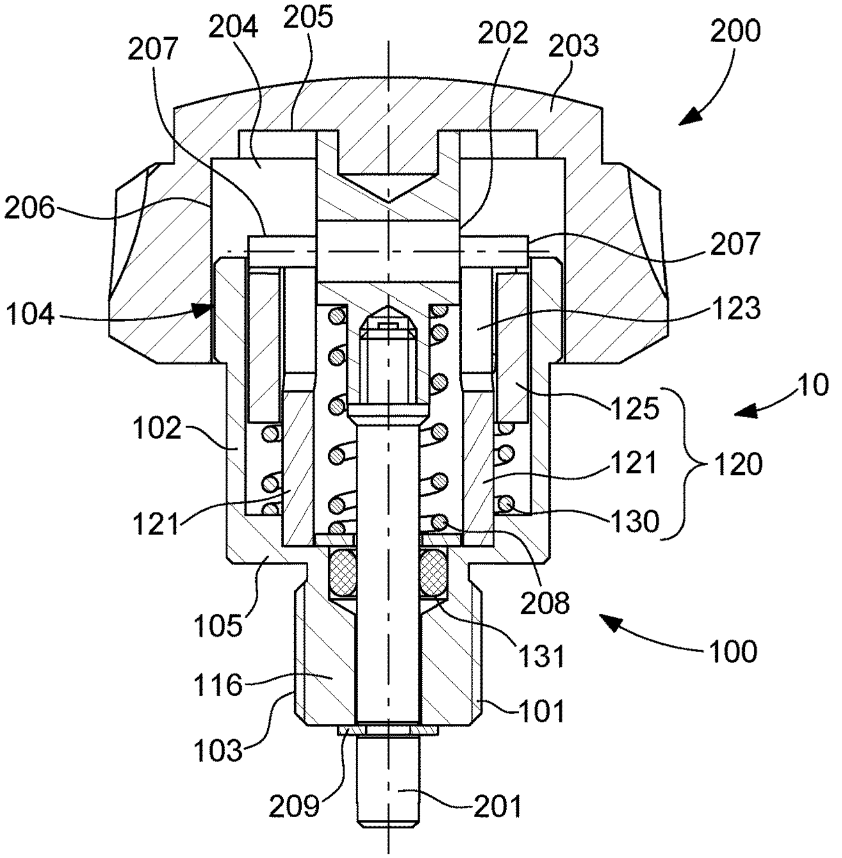
FIG. 1 shows a longitudinal sectional view of a device for controlling a horological movement according to a preferred exemplary embodiment of the invention, said control device including two parts in the inactive position.
Figure 2:
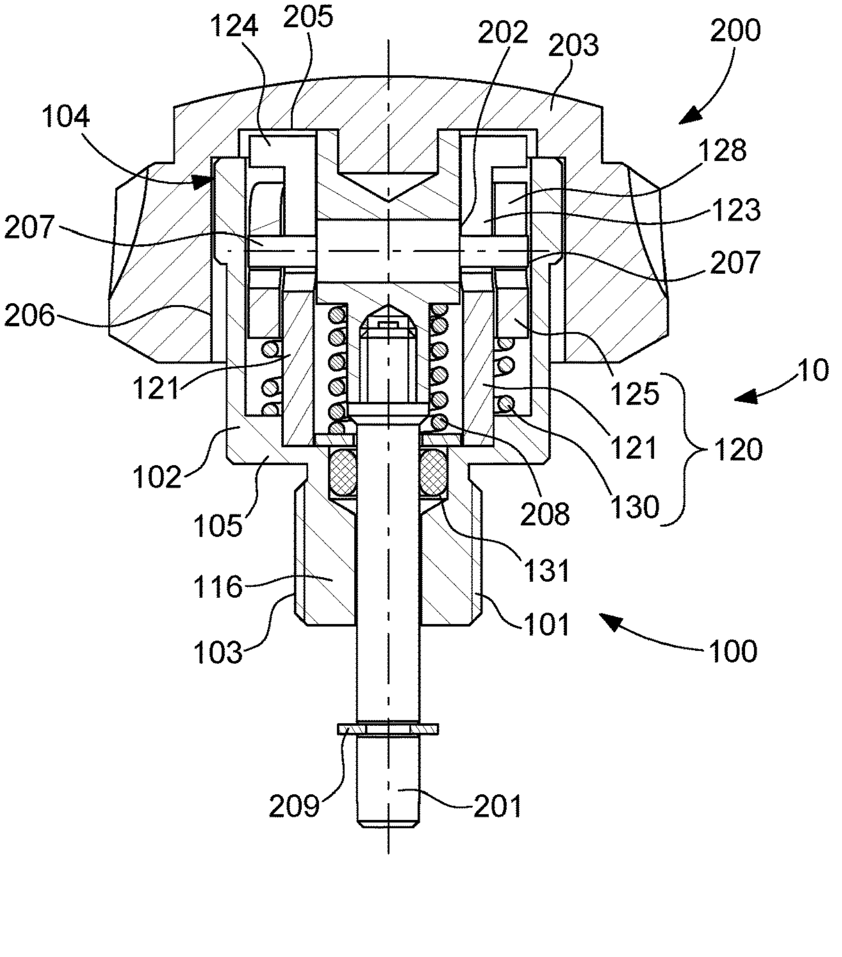
FIG. 2 shows a longitudinal sectional view of the control device of FIG. 1 wherein the two parts are positioned in the active position.

FIGS. 1 and 2 show a preferred exemplary embodiment of a control device 10 of a horological movement according to the present invention.

The control device 10 can be in the shape of a push crown, of a winding crown or of any crown or button allowing to act on the horological movement by pressure of the user.

The control device 10 is intended to be engaged through a middle part of a case (not shown) of a timepiece, in particular of a watch, in a manner known to the person skilled in the art, wherein the horological movement is housed.

More particularly, for this purpose, the control device 10 according to the invention includes a first part 100 comprising a sliding guide tube 101 intended to be fixedly engaged into a through orifice extending radially in the middle part. In other words, the guide tube 101 is intended to be fixed relative to the horological movement.

The first part 100 further comprises an activation module 120, shown in detail in FIGS. 3 to 6, allowing the generation of a sensation of tactile feedback of a user, as described later in detail.

Moreover, the control device 10 includes a second movable part 200 comprising an adjustment rod 201 extending through the guide tube 101. Said rod is fixed, at one of its ends, via a slider 202, to a head 203 covering the guide tube 101.

The adjustment rod 201 is slidably engaged in an axial direction through the guide tube 101, so that the second part 200 slides relative to the first part 100 between an active position, shown in FIG. 2, wherein the adjustment rod 201 is able to be integral with a component of the horological movement, and an inactive position, shown in FIG. 1, wherein the adjustment rod 201 is able to release the component of the horological movement, that is to say that it is not integral with said component.

In the present text, the term "integral" is understood to mean that two parts are kinematically connected together so that one can transmit a movement or a force to the other. In other words, when the adjustment rod 201 is integral with the horological movement, it can act on the latter.

More particularly, when the second part 200 occupies the active position, it is retracted, as seen in FIG. 2, and when the second part 200 occupies the inactive position, it is deployed, as seen in FIG. 1.

The change of position of the second part 200 is caused by a user by displacing the head 203 along the axial direction. More particularly, in the preferred exemplary embodiment of the invention, the second part 200 is driven into the inactive position by an elastic member 208 described in detail in the following text, and is intended to be driven into the active position upon pressure of the user.

Advantageously, the slider 202 cooperates with the activation module 120 so that they exert mechanical stresses on each other when the second part 200 moves between the active and inactive positions, and so that these mechanical stresses are released when the second part 200 reaches one of the active or inactive positions, in particular the inactive position in the preferred exemplary embodiment described in the present text.

Thanks to this feature, when the user presses the head 203 so as to translate the second part 200 to its active position, it will act against the forces resulting from the mechanical stresses that the slider 202 and the activation module 120 exert against each other. The user therefore feels a mechanical resistance throughout the travel of the second part 200.

Moreover, when the user releases the pressure he exerts on the head 203, or pulls said head 203, depending on the presence or not of an elastic return member, so as to displace the second part 200 to the inactive position, he feels a resistance throughout the travel of the second part 200, until said second part 200 reaches the inactive position, the mechanical stresses then being suddenly released, the user feels a sudden release of these forces.

Thus, the control device 10 causes in the user a sensation of tactile feedback, and more precisely, a clear sensation of indexing when he handles the second part 200 as described above.

A particular exemplary embodiment of the invention shown in FIGS. 1 to 6 is described in more detail below.

As shown in FIGS. 1 and 2, the head 203 has a blind cavity 204 of substantially cylindrical shape of revolution, defined by a bottom wall 205 and by a peripheral wall 206.

The slider 202 has a cylindrical shape of revolution and connects the head 203 and the adjustment rod 201 by each of its ends.

Advantageously, the slider 202 is housed in the cavity 204 and is fixed against the bottom wall 205, by screwing and/or gluing, or by any other appropriate means.

The slider 202 includes rotation stop members arranged to cooperate with complementary rotation stop members of the activation module 120 so as to prevent the rotation of the slider 202, in particular during the displacement of the second part 200.

In the preferred exemplary embodiment of the invention shown in FIGS. 1 to 6, the rotation stop members are formed by at least one radial rod 207, preferably two diametrically opposite radial rods 207.

The guide tube 101 preferably has two translation guide surfaces with respect to the second part 200.

More particularly, in the preferred exemplary embodiment of the invention shown in FIGS. 1 and 2, the guide tube 101 has the shape of a stepped cylinder comprising a first cylindrical portion 102 and a second cylindrical portion 103. As visible in FIGS. 1 and 2, the first cylindrical portion 102 has a larger diameter than the second cylindrical portion 103.

The first cylindrical portion 102 is engaged into the cavity 204 of the head 203, said first cylindrical portion 102 including a peripheral wall the outer surface of which slidably cooperates by sliding fit with the inner surface of the peripheral wall 206 of the head 203. In particular, the peripheral wall may comprise an annular surface 104 designed to slide against the peripheral wall 206 of the head 203.

The first cylindrical portion 102 comprises a bottom wall 105 by which it is connected to the second cylindrical portion 103. Said bottom wall 105 forms a shoulder and defines, with the peripheral wall of the first cylindrical portion 102, an internal volume.

In this exemplary embodiment, as illustrated in FIGS. 1 to 6, the activation module 120 is housed in the internal volume of the first cylindrical portion 102.

The activation module 120 includes a sheath 121 having a cylindrical shape of revolution, fixed concentrically to the guide tube 101. The sheath 121 includes a peripheral wall 122 on which are arranged complementary rotation stop members cooperating with those of the slider 202. These complementary rotation stop members are, in the exemplary embodiment shown in FIGS. 1 to 6, in the form of at least one slot 123, preferably two slots, extending axially so as to slidably guide the radial rods 207 during the displacement of the second part 200 between the active and inactive positions.

More particularly, the radial rods 207 extend through and beyond the slots 123.

In the preferred exemplary embodiment, the slots 123 are diametrically opposite to each other and open onto one end of the sheath 121 facing the head 203, said end being called "distal end" in the remainder of the text.

The terms "distal" and "proximal" relate in the present text to the remoteness from the horological movement.

The distal end is opposite to a proximal end fixed to the guide tube 101, more particularly to the bottom wall 105.

Figure 3:
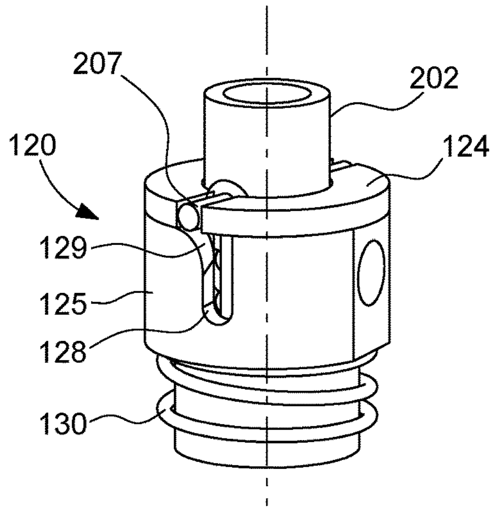
FIG. 3 shows a detail perspective view of an activation module cooperating with a slider of the control device of FIG. 1.

The sheath 121 comprises a radial flange 124 at its distal end forming a shoulder. The radial flange 124 is perforated radially, in the continuation of the slots 123, so as to receive the radial rods 207 when the second part 200 is in the inactive position, as shown in FIGS. 1 and 3.

The radial flange 124, the bottom wall 105, and the respective peripheral walls of the first cylindrical portion 102 and of the sheath 121 define an annular volume wherein a sleeve 125 is arranged.

The sleeve 125 is kinematically connected with the sheath 121 in a helical connection. More specifically, as shown in the exploded views of FIGS. 4 and 6, the sleeve 125 preferably includes at least one follower 126 in the shape of a stud, extending radially towards the sheath 121. Moreover, the sheath 121 includes at least one helical aperture 127 arranged in its peripheral wall so as to receive the follower 126, and constituting a sliding path for said follower 126.

Preferably, the sleeve 125 includes two diametrically opposite followers 126, engaged respectively into two helical apertures 127 of the sheath 121.

The two helical apertures 127 are symmetrical to each other along an axis of revolution of the sheath 121.

The sleeve 125 further includes, as shown in FIGS. 1 to 6, at least one slot 128 extending axially, intended to receive a radial rod 207. Said at least one slot 128 opens through an opening onto one end of the sleeve 125, called "distal end", opposite to the radial flange 124.

Preferably, the sleeve 125 includes two diametrically opposite slots 128, said slots 128 including, at the opening, a guide profile 129 formed by an inclined face or a fillet. As illustrated in FIGS. 3 to 6, the guide profile 129 allows to widen said slots 128.

Advantageously, the sleeve 125 is subjected to an elastic force generated by an elastic member 130 tending to displace said sleeve 125 towards the radial flange 124. In other words, the elastic member 130 tends to displace the sleeve 125 towards the distal end of the sheath 121. Consequently, the elastic force also tends to pivot the sleeve 125, due to the helical connection, so that the slot 128 is angularly offset relative to that of the sheath 121, that is to say so that the two slots are not facing each other.

The elastic member 130 is arranged to bear against the bottom wall 105 of the guide tube 101 and against a proximal end of the sleeve 125, opposite to the distal end of said sleeve 125. The elastic member 130 works in compression and is preferably formed by a helical spring.

Thanks to these features, when the second part 200 is driven from the inactive position to the active position, the radial rods 207 displace from the distal end of the sheath 121, along the slot 123 of said sheath 121, and at the same time, against the guide profile 129 of the sleeve 125, which gradually drives them into the slots 128 of said sleeve 125, so that the rods slide along said slots 128.

Figure 5:
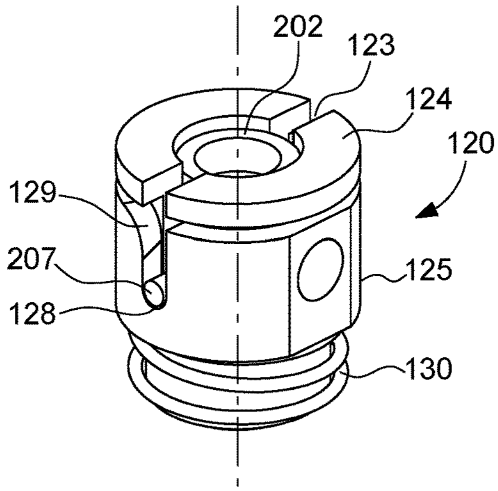
FIG. 5 shows a detail perspective view of an activation module cooperating with a slider of the control device of FIG. 2.
Figure 4:
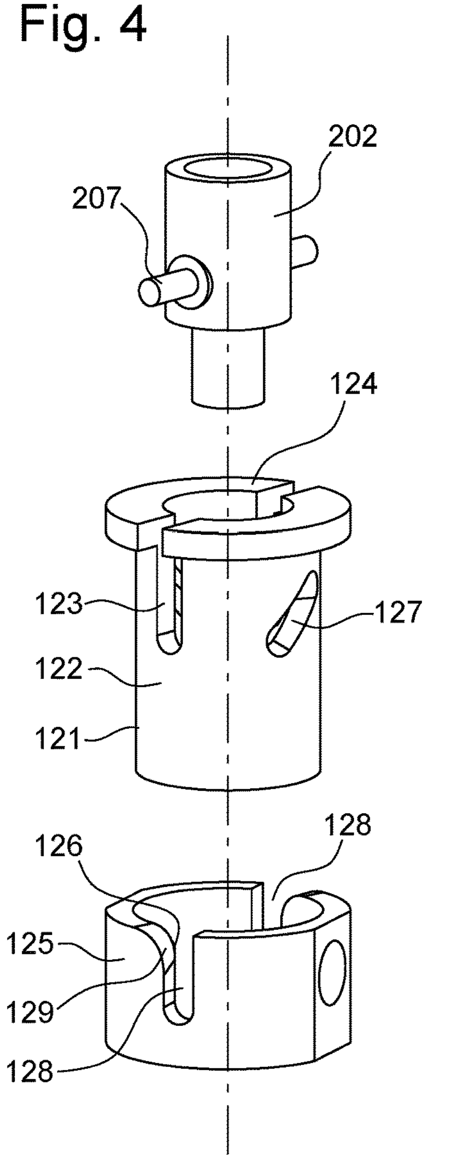
FIG. 4 shows an exploded view of FIG. 3.
Figure 6:
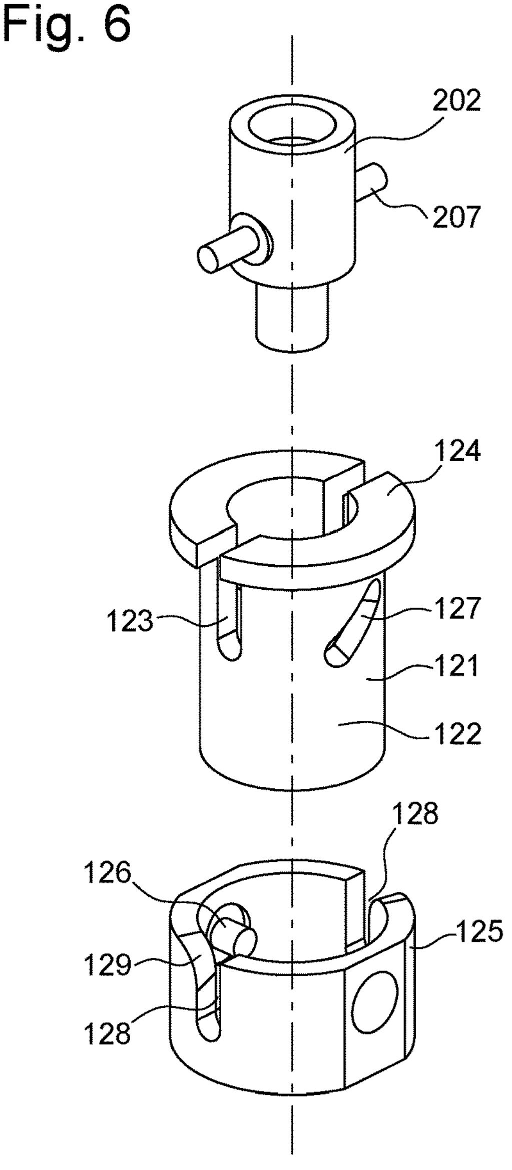
FIG. 6 shows an exploded view of FIG. 5.

The displacement of the radial rods 207 against the guide profile 129 causes the sleeve 125 to pivot, as shown in particular in FIGS. 3 and 5, and therefore a displacement of the followers 126 within the helical apertures 127, and consequently, a translation of the sleeve 125 against the elastic force generated by the elastic member 130.

The elastic force is thus at the origin of the forces generated by the sleeve 125 on the sliders 202; the latter being engaged into the slots 123 of the sheath 121, they generate forces antagonistic to those generated by the sleeve 125. Thus, the slider 202 and the activation module 120 exert against each other reciprocal mechanical stresses tending to slow down the travel of the second part 200 between its active and inactive positions.

In other words, the purpose of the helical connection between the sleeve 125 and the sheath 121 is to transform the linear force of the elastic force into a torsional force tending to slow down the travel of the second part 200 between its active and inactive positions.

Moreover, when the second part 200 is driven from the active position to the inactive position, the radial rods 207 displace, through the respective slots 123 and 128 of the sheath 121 and of the sleeve 125, towards their respective distal end. Until they reach the guide profile 129, against which they are bearingly driven by the rotation of the sleeve 125 caused by the helical connection between the sheath 121 and said sleeve 125, under the action of the elastic force.

The second part 200 is driven in translation in the inactive position by an elastic member 208 constituted, in the example shown in the figures, by a compression spring.

To this end, the adjustment rod 201 includes a distal stop, formed in the preferred exemplary embodiment of the invention, by a radial shoulder resulting from a reduction in section. Thanks to this reduction in section, an annular volume is formed between the adjustment rod 201 and the sheath 121, allowing the arrangement of the compression spring.

More particularly, the compression spring is bearingly arranged against the bottom wall 105 and against the radial shoulder, so as to generate a force tending to move the head 203 and the slider 202 away from the guide tube 101.

The adjustment rod 201 includes a proximal stop, formed in the preferred exemplary embodiment of the invention by an elastic ring 209 housed in an annular groove extending radially in said adjustment rod 201.

The guide tube 101 bears against the elastic ring 209 when the second part 200 occupies the inactive position, as shown in FIG. 1.

Thus, when the user releases the pressure exerted on the head 203, the second part 200 is driven to the inactive position by the elastic member 208. The user accompanying the second part 200 in its displacement to the inactive position, he feels the release of the mechanical stresses exerted between the sleeve 125 and the slider 202 at the end of travel, and consequently he feels a sensation of tactile feedback indicating to him that the second part 200 has reached the inactive position.

The second cylindrical portion 103 of the guide tube 101 is sleeved around the adjustment rod 201, said second cylindrical portion 103 including a peripheral wall 116 the inner surface of which slidably cooperates by sliding fit with said adjustment rod 201.

Furthermore, the second cylindrical portion 103 includes a recessing 131 receiving seals interposed between the peripheral wall of the second cylindrical portion 103 and the adjustment rod 201.

Finally, the second cylindrical portion 103 comprises a free end opposite to the first cylindrical portion 102, provided to bear against the distal stop of the adjustment rod 201 when the second part 200 occupies the inactive position.

The invention claimed is:

1. A control device of a horological movement comprising:

a first part comprising a guide tube intended to be fixed relative to said horological movement and an activation module; and a second part slidably guided by the guide tube in an axial direction relative to said first part, between an active position in which the second part is able to be integral, by means of an adjustment rod, with a component of the horological movement, and an inactive position in which said adjustment rod is intended to release the component of the horological movement, wherein said second part comprises a slider fixed to the adjustment rod and cooperating with the activation module such that the slider and the activate module exert mechanical stresses on each other when the second part moves between the active position and inactive position, and the mechanical stresses are released when the second part reaches one of the active position or inactive position, and wherein the activation module includes a sheath fixed to the guide tube, cooperating with the slider so as to guide the slider in translation without degree of freedom in rotation, and a sleeve kinematically connected with the sheath in a helical connection and being configured, under the action of an elastic member, to apply mechanical stresses to the slider when the second part moves between the active position and inactive position.

2. The control device according to claim 1, wherein the activation module exerts the mechanical stresses on the slider in response to a displacement of said slider when the second part moves between the active position and inactive position and releases the mechanical stresses when the second part reaches the inactive position.

3. The control device according to claim 1, wherein the sleeve and the sheath respectively include at least one slot extending axially, each of the at least one slot being configured to receive a radial rod of the slider when the second part moves between the active position and inactive position.

4. The control device according to claim 3, wherein the at least one slot of the sleeve opens through an opening at one end of said sleeve and includes a guide profile formed by an increase in section of the slot, the guide profile being configured so that when the second part displaces from the inactive position to the active position, the radial rod exerts forces against the guide profile causing the sleeve to displace against the forces exerted by the elastic member.

5. The control device according to claim 1, wherein the sheath includes a radial flange at one of its ends in the continuation of the slot, said radial flange being perforated so as to receive the radial rod when the second part-is in the inactive position.

6. The control device-according to claim 5, wherein the sheath and the guide tube define an annular volume wherein the sleeve is arranged.

7. The control device according to claim 1, wherein the sleeve preferably includes at least one follower, extending radially towards the sheath, and wherein said sheath includes at least one helical aperture arranged so as to receive said the at least one follower, and constituting a sliding path for said at least one follower.

8. The control device according to claim 1, wherein the guide tube has the shape of a stepped cylinder, comprising a first cylindrical portion a peripheral wall of which is guided in translation by a peripheral wall of a blind cavity of the head, and comprising a second cylindrical portion a peripheral wall of which guiding the adjustment rod in translation, the activation module being housed in the internal volume of the first cylindrical portion.

9. The control device according to claim 8, wherein the guide tube includes a bottom wall forming a shoulder between its two cylindrical portions, said bottom wall bearingly receiving the elastic member.

10. A timepiece comprising the control device according to claim 1, further comprising a case wherein the horological movement is housed, and through which said control device is inserted, the adjustment rod being connected to said horological movement.

* * * * *